United States Patent
Ogawa

(10) Patent No.: US 12,553,602 B2
(45) Date of Patent: Feb. 17, 2026

(54) BUILT-IN VENTILATION FAN

(71) Applicant: Panasonic Intellectual Property Management Co., Ltd., Osaka (JP)

(72) Inventor: Daisuke Ogawa, San Diego, CA (US)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 19/046,074

(22) Filed: Feb. 5, 2025

(65) Prior Publication Data

US 2025/0271132 A1    Aug. 28, 2025

Related U.S. Application Data

(60) Provisional application No. 63/557,855, filed on Feb. 26, 2024.

(51) Int. Cl.
| | |
|---|---|
| *F21V 33/00* | (2006.01) |
| *F24F 7/007* | (2006.01) |
| *F24F 13/078* | (2006.01) |
| *F24F 13/08* | (2006.01) |

(52) U.S. Cl.
CPC .......... *F21V 33/0088* (2013.01); *F24F 13/08* (2013.01); *F21V 33/0096* (2013.01); *F24F 7/007* (2013.01); *F24F 13/078* (2013.01)

(58) Field of Classification Search
CPC . F21V 33/0088; F21V 33/0096; F24F 13/078
See application file for complete search history.

(56) References Cited

U.S. PATENT DOCUMENTS

| | | | |
|---|---|---|---|
| 2015/0167990 A1* | 6/2015 | Zakula | F24F 7/007 |
| | | | 454/293 |
| 2018/0180320 A1 | 6/2018 | Maeda et al. | |
| 2019/0277520 A1* | 9/2019 | Zakula | F24F 13/078 |
| 2019/0292315 A1* | 9/2019 | Niemiec | E04B 9/02 |
| 2022/0275150 A1* | 9/2022 | Niemiec | C08G 81/00 |
| 2023/0349544 A1* | 11/2023 | Niemiec | F21V 29/61 |
| 2024/0159407 A1* | 5/2024 | Zakula | F21V 23/003 |

\* cited by examiner

*Primary Examiner* — Alexander K Garlen
(74) *Attorney, Agent, or Firm* — Renner, Otto, Boisselle & Sklar, LLP

(57) ABSTRACT

An annular light emitting unit emits light from the inside of a louver toward an outer circumference, with respect to the entire circumference direction. A surface emitting unit emits light in a vertical direction directed opposite to a casing. Light intensity of the surface emitting unit is greater than light intensity of the annular light emitting unit.

8 Claims, 4 Drawing Sheets

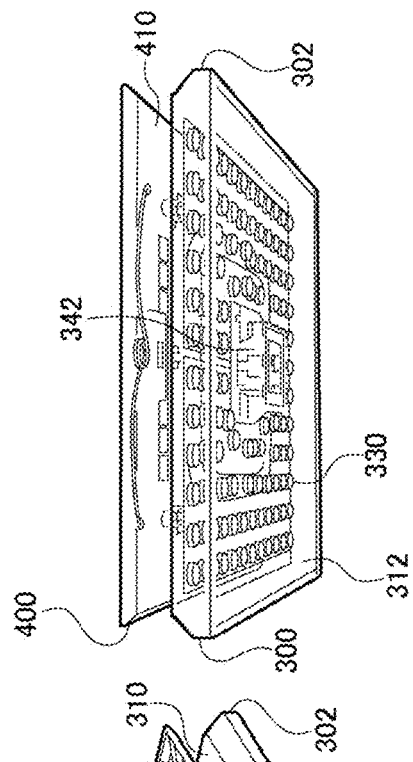
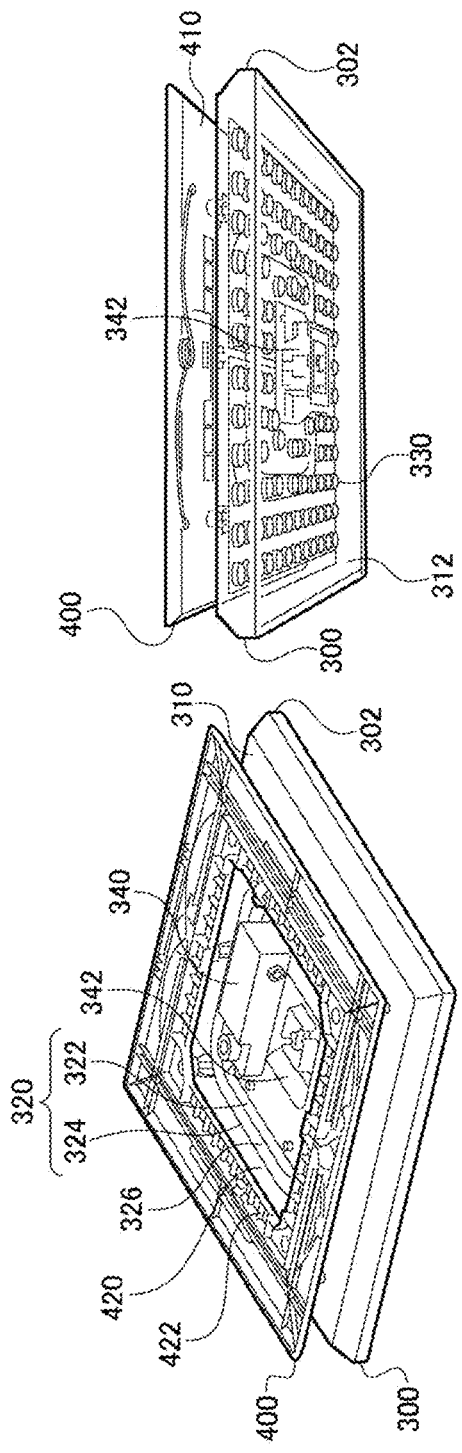
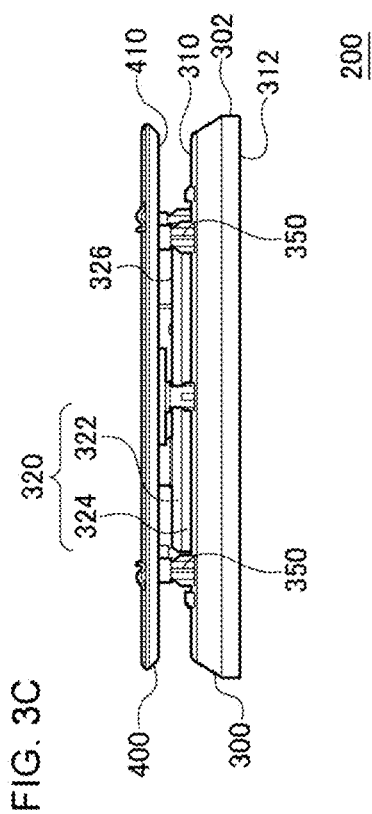

BUILT-IN VENTILATION FAN

BACKGROUND

1. Field

The present disclosure relates to a built-in ventilation fan.

2. Description of the Related Art

In the main body of a ventilation fan, a ventilation grille is disposed on a surface exposed to the user. The ventilation grille includes a panel having an annular shape, a lamp unit provided in a central part of the panel, and an intake opening provided around the central part (see Patent Literature 1, for example).
Patent Literature 1: Specification of U.S. Patent Application Publication No. 2018/0180320

Depending on where the ventilation fan is installed, design may be required for the ventilation fan. Meanwhile, also in a situation where design is required, an air flow path needs to be ensured.

SUMMARY

The present disclosure has been made to solve the problem above, and a purpose thereof is to provide a technology for ensuring an air flow path while improving the design.

To solve the problem above, a built-in ventilation fan according to one embodiment of the present disclosure includes: a casing that includes a first surface and a second surface different from each other, a suction port provided on the first surface, and a blow-out port provided on the second surface; and a louver that is provided on the upstream side of the suction port and that leads air to the suction port from a direction parallel to the first surface. The louver includes an annular light emitting unit disposed on an inner surface that faces the first surface, and a surface emitting unit disposed on a back surface that faces opposite to the inner surface and that prevents the air from flowing into the suction port from a direction perpendicular to the first surface. The annular light emitting unit emits light from the inside of the louver toward an outer circumference, with respect to the entire circumference direction. The surface emitting unit emits light in the vertical direction directed opposite to the casing. The light intensity of the surface emitting unit is greater than the light intensity of the annular light emitting unit.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 3A-3C are diagrams that show a structure of a louver shown in FIGS. 1A-1D.

DETAILED DESCRIPTION

Figure 1B:
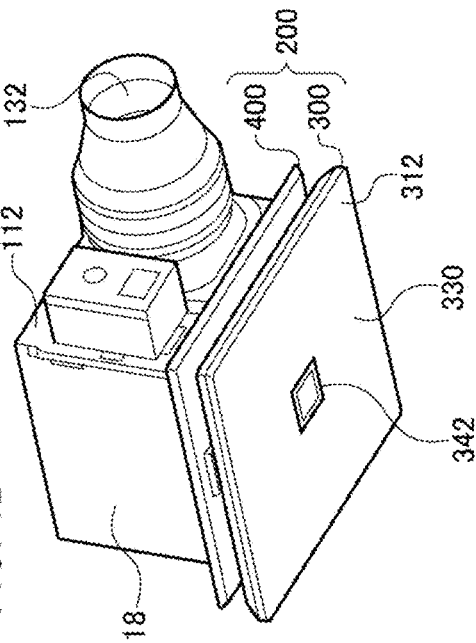
FIGS. 1A-1D are diagrams that show a structure of a built-in ventilation fan according to the present embodiment.

The invention will now be described by reference to the preferred embodiments. This does not intend to limit the scope of the present invention, but to exemplify the invention.

In the following, the present embodiment will be described with reference to the accompanying drawings. The embodiment described below shows a suitable specific example of the present disclosure. Therefore, the numerical values, shapes, materials, constituting elements, arranged positions and connection forms of the constituting elements, and the like shown in the following embodiment are mere examples and are not intended to limit the present disclosure. Accordingly, among the constituting elements in the following embodiment, a constituting element that is not described in an independent claim, which indicates the most generic concept of the present disclosure, will be described as an arbitrary constituting element. In each drawing, the same reference characters denote substantially the same configurations, and repetitive description will be omitted or simplified.

Figure 1D:
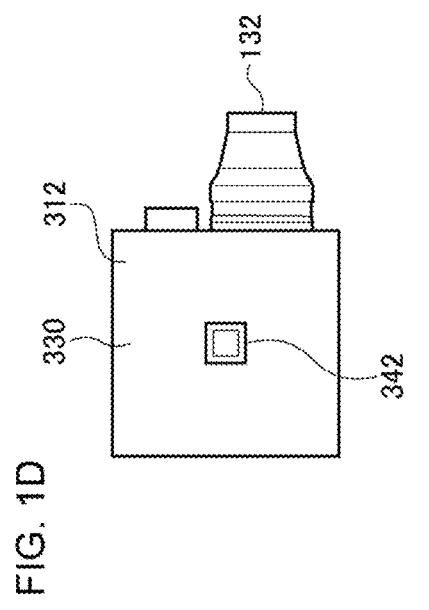
Figure 1A:
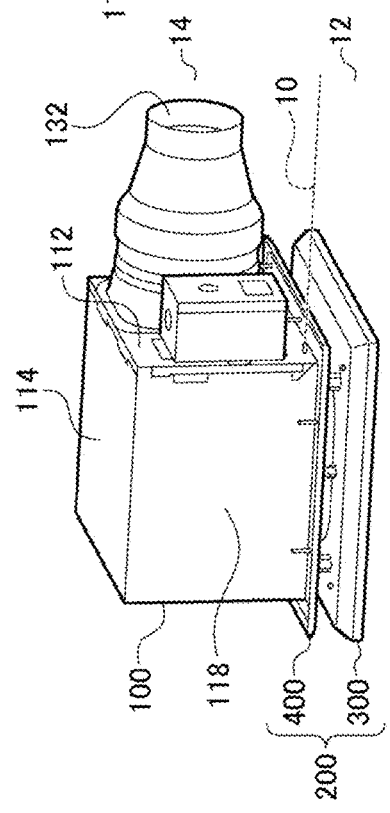

FIGS. 1A-1D show a structure of a built-in ventilation fan 1000. FIG. 1A is a perspective view of the built-in ventilation fan 1000. The built-in ventilation fan 1000 includes a casing 100 and a louver 200. When the casing 100 is embedded in a ceiling surface 10, the casing 100 is placed in a ceiling space 14, and the louver 200 is placed in an interior space 12. At the time, the casing 100 side is referred to as the "upper" side, and the louver 200 side is referred to as the "lower" side. However, the built-in ventilation fan 1000 may also be embedded in a wall surface or the like, instead of the ceiling surface 10.

Figure 1C:
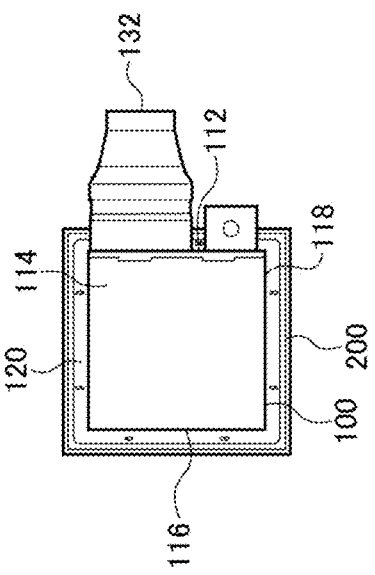
Figure 2B:
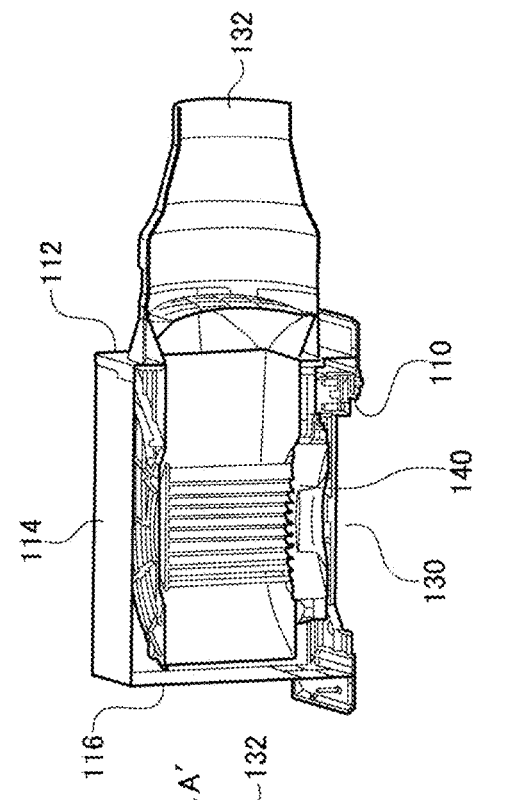
FIGS. 2A-2B are diagrams that show a structure of a casing shown in FIGS. 1A-1D.
Figure 2A:
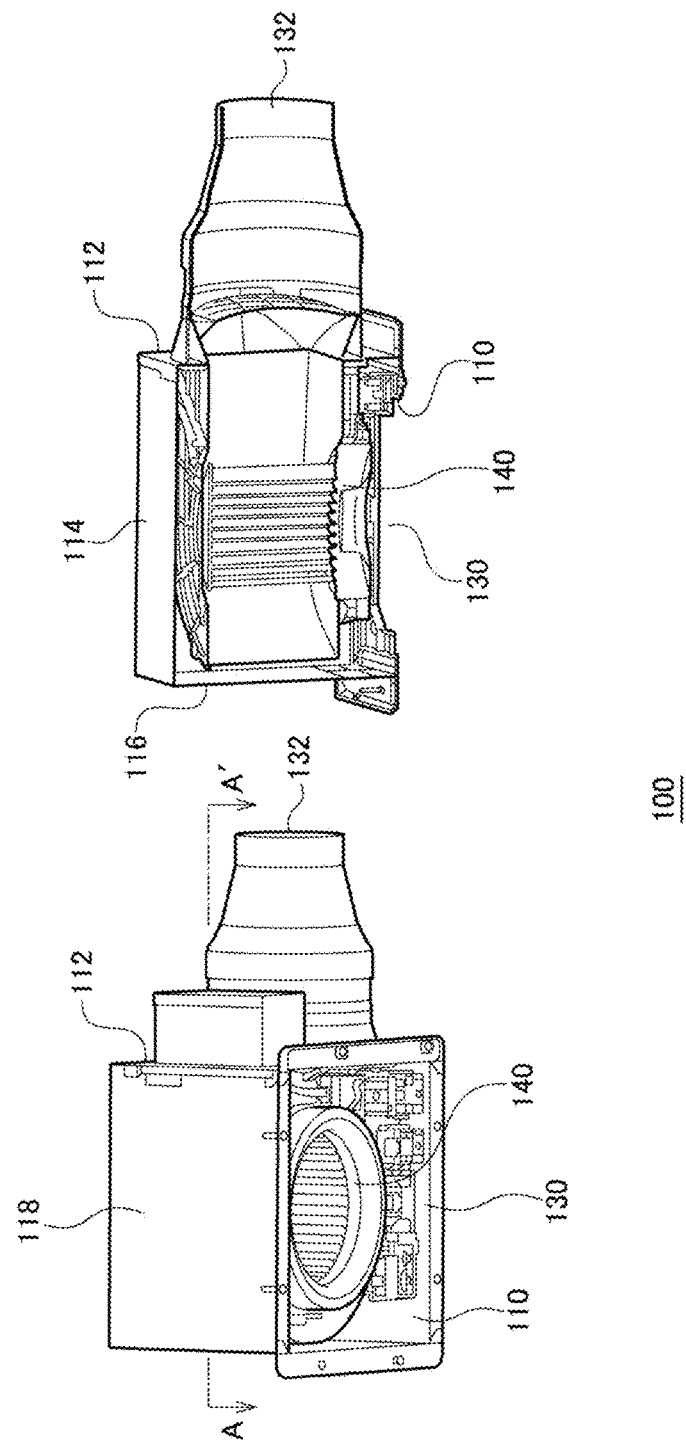

FIG. 1B is a perspective view of the built-in ventilation fan 1000 viewed from the lower side. FIG. 1C is a top view of the built-in ventilation fan 1000. FIG. 1D is a bottom view of the built-in ventilation fan 1000. Also, FIGS. 2A-2B show a structure of the casing 100. FIG. 2A is a perspective view of the casing 100 viewed from the lower side, and FIG. 2B is a sectional perspective view taken along line A-A' in FIG. 2A. The casing 100 has a hollow box shape constituted by a first surface 110, a second surface 112, a third surface 114, a fourth surface 116, a fifth surface 118, and a sixth surface 120. Since the first surface 110 is a lower surface and the third surface 114 is an upper surface, the first surface 110 and the third surface 114 face in opposite directions. Also, the second surface 112, fourth surface 116, fifth surface 118, and sixth surface 120 are side surfaces, in which the second surface 112 and the fourth surface 116 face in opposite directions, and the fifth surface 118 and the sixth surface 120 face in opposite directions.

A suction port 130 is provided on the first surface 110, and a blow-out port 132 is provided on the second surface 112. The suction port 130 and the blow-out port 132 are openings that each connect the hollow space of the casing 100 and external space. In the hollow space of the casing 100, a blower 140 is disposed. The blower 140 is, for example, a centrifugal blower that includes a scroll casing and a sirocco fan. The blower 140 is not limited to a centrifugal blower. When the blower 140 operates, air outside the casing 100 is sucked into the hollow space through the suction port 130, and air in the hollow space is blown out of the casing 100 through the blow-out port 132. That is, air is sucked into the casing 100 from a direction perpendicular to the first surface 110, particularly from the lower side to the upper side, and air is blown out of the casing 100 in a direction along the first surface 110. The blower 140 may not be disposed in the hollow space of the casing 100. For example, the blower 140 may be disposed at a position posterior to a duct to which the blow-out port 132 is connected. In that case, the casing 100 serves to change the direction in which air flows.

Figure 4:
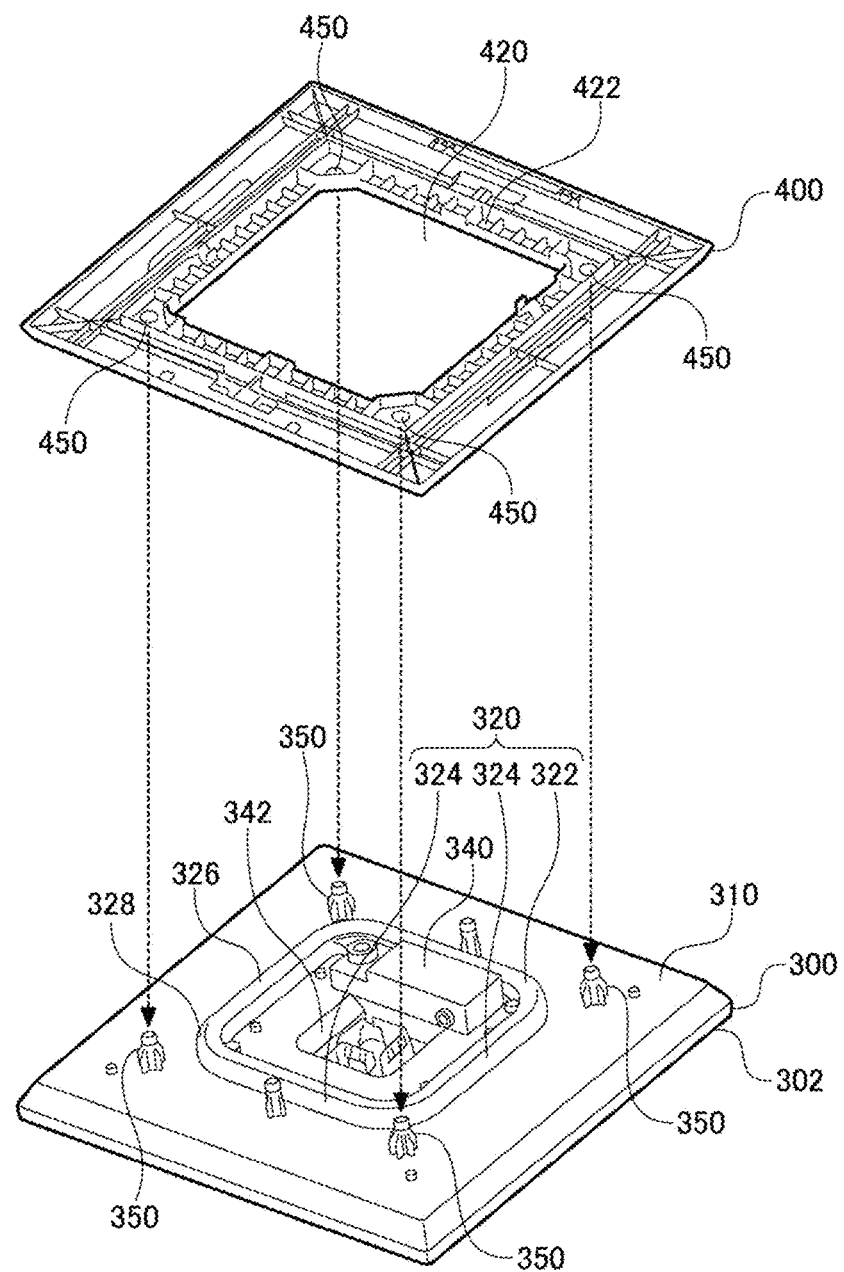
FIG. 4 is an exploded perspective view of the louver shown in FIGS. 3A-3C.

As shown in FIGS. 1A-1D, the louver 200 is connected to the lower side of the casing 100, i.e., the upstream side of the suction port 130 of the casing 100. FIGS. 3A-3C show a structure of the louver 200. In particular, FIG. 3A is a perspective view of the louver 200 viewed from the upper side, FIG. 3B is a perspective view of the louver 200 viewed from the lower side, and FIG. 3C is a side view of the louver 200. Further, FIG. 4 is an exploded perspective view of the louver 200. The louver 200 includes a base 300 disposed on the lower side, and a connection unit 400 disposed on the upper side.

The base 300 has a quadrangular frustum shape, for example. On the upper side of the base 300, a base-side inner surface 310 is provided. On the lower side of the base 300, a back surface 312 facing opposite to the base-side inner surface 310 is provided. The base-side inner surface 310 and the back surface 312 each have a rectangular shape. Although the outer circumference of the back surface 312 will be referred to as an outer circumference edge 302 here, the outer circumference of the base-side inner surface 310 may also be referred to as an outer circumference edge.

In an inner portion near the center of the base-side inner surface 310, a projection 322, which projects annularly in an upward direction from the base-side inner surface 310, is provided. The upward direction can also be said to be the direction toward the casing 100. A surface of the projection 322 on the outer circumference side is an outer circumference wall 328, and the upper edge of the outer circumference wall 328 is a top edge 326. The top edge 326 of the outer circumference wall 328 has a curved surface shape. Also, outside the projection 322 on the base-side inner surface 310, multiple, e.g., four, connection protrusions 350 are provided. Each connection protrusion 350 has a columnar shape extending upward from the base-side inner surface 310.

The connection unit 400 has an inverted quadrangular frustum shape or a plate shape, for example. On the lower side of the connection unit 400, a connection unit-side inner surface 410, which faces the base-side inner surface 310, is provided. The connection unit-side inner surface 410 has a rectangular shape, and, in the center of the connection unit-side inner surface 410, a center opening 420 penetrating in a vertical direction is provided. The center opening 420 also has a rectangular shape. Around the center opening 420, a lattice portion 422 having multiple openings is disposed. The lattice portion 422 reinforces the connection unit 400, with a lattice shape surrounding the multiple openings. Also, around the center opening 420, multiple, e.g., four, connection through holes 450 are provided. The size of each connection through hole 450 is adapted to the size of a connection protrusion 350.

By inserting the connection protrusions 350 into the connection through holes 450, the base 300 and the connection unit 400 are connected, with the base-side inner surface 310 and the connection unit-side inner surface 410 separated. At the time, the outer circumference wall 328 of the projection 322 is located inside the lattice portion 422. Also, the first surface 110 of the casing 100 is connected to the side opposite to the connection unit-side inner surface 410 of the connection unit 400. Therefore, it can be said that the connection unit 400 connects the base 300 and the casing 100.

When the blower 140 in the casing 100 operates in a state where the casing 100, the base 300, and the connection unit 400 are connected, air is introduced into a space between the base-side inner surface 310 and the connection unit-side inner surface 410. The air is directed toward the outer circumference wall 328 of the projection 322 in a direction parallel to the base-side inner surface 310. The direction parallel to the base-side inner surface 310 can also be said to be a direction parallel to the first surface 110. The air is directed upward along the outer circumference wall 328 of the projection 322, passes through the center opening 420 and the lattice portion 422, and is led to the suction port 130. To form such a flow of air, the back surface 312 of the base 300 prevents air from flowing into the suction port 130 from a direction perpendicular to the first surface 110, i.e., prevents flowing in of air from the lower side to the upper side.

On the back surface 312, a surface emitting unit 330 of annular shape is disposed. The surface emitting unit 330 emits light, facing downward, i.e., in a vertical direction directed opposite to the casing 100. Also, on the outer circumference wall 328 of the projection 322, multiple light emitting units 324 are arranged. The projection 322 and the multiple light emitting units 324 are collectively referred to as an annular light emitting unit 320. As shown in the arrangement of the projection 322 described above, the annular light emitting unit 320 is disposed, on the base-side inner surface 310, inside the outer circumference edge 302 of the louver 200. Since the outer circumference wall 328 of the projection 322 faces toward the outer circumference, the multiple light emitting units 324 emit light toward the outer circumference. Therefore, the annular light emitting unit 320 emits light from the inside of the louver 200 toward the outer circumference, with respect to the entire circumference direction.

With such arrangement of the annular light emitting unit 320 and the surface emitting unit 330, the annular light emitting unit 320 serves for indirect illumination, and the surface emitting unit 330 serves for direct illumination. Also, the light intensity of the surface emitting unit 330 is made greater than the light intensity of the annular light emitting unit 320.

Inside the annular shape of the projection 322 in the base 300, a power supply unit 340 is disposed. The power supply unit 340 is connected to the multiple light emitting units 324 and the surface emitting unit 330. The power supply unit 340 supplies electricity to each of the multiple light emitting units 324 and the surface emitting unit 330 and also controls the light emission of each of the multiple light emitting units 324 and the surface emitting unit 330. The operation of the power supply unit 340 is not limited thereto.

In the base 300, a human detection sensor 342 is disposed inside the annular shape of the projection 322 and closer to the base-side inner surface 310 than the top edge 326 of the projection 322. The human detection sensor 342 is also exposed in a center portion of the back surface 312. That is, the human detection sensor 342 is disposed surrounded by the surface emitting unit 330. The human detection sensor 342 detects the presence of a person on the back surface 312 side, i.e., in the interior space 12. Since a publicly-known technology may be used for the detection of the presence of a person by the human detection sensor 342, description thereof is omitted here. The human detection sensor 342 is connected to the power supply unit 340 and outputs the result of detection of a person's presence to the power supply unit 340. Upon reception of the detection result from the human detection sensor 342, the power supply unit 340 controls the turning on or off of the multiple light emitting units 324 and also controls the turning on or off of the surface emitting unit 330.

According to the present embodiment, the suction port 130 is provided on the first surface 110 of the casing 100, the louver 200 is provided on the upstream side of the suction port 130, and air is led to the suction port 130 from a direction parallel to the first surface 110. Therefore, an air flow path can be ensured. Also, the annular light emitting unit 320 emits light from the inside of the louver 200 toward the outer circumference, with respect to the entire circumference direction, so that indirect illumination can be realized. Since indirect illumination can be realized, the design can be improved. Also, since the light intensity of the surface emitting unit 330 is greater than the light intensity of the annular light emitting unit 320, brightness can be ensured.

Also, since the annular light emitting unit 320 is disposed inside the outer circumference edge 302 of the louver 200, indirect illumination can be realized. Also, since the multiple light emitting units 324 are arranged on the outer circumference wall 328 of the projection 322, which projects annularly in the direction from the base-side inner surface 310 toward the casing 100, air can be smoothly directed to the suction port 130. Also, since the power supply unit 340 is disposed inside the annular shape of the projection 322, obstruction to a flow of air by the power supply unit 340 can be prevented. Further, since the human detection sensor 342 is disposed inside the annular shape of the projection 322 and closer to the base-side inner surface 310 than the top edge of the projection 322, obstruction to a flow of air by the power supply unit 340 can be prevented.

Also, since the center opening 420 and the lattice portion 422, which allow air to pass through, are arranged in the connection unit 400, an air flow path can be ensured. Also, since the outer circumference wall 328 of the projection 322 is disposed inside the lattice portion 422, the base 300 and the connection unit 400 can be combined. Further, since the top edge 326 of the outer circumference wall 328 of the projection 322 has a curved surface shape, air can be smoothly directed to the suction port 130.

The outline of one embodiment of the present disclosure is as follows.

Item 1

A built-in ventilation fan (1000), including:
 a casing (100) that includes a first surface (110) and a second surface (112) different from each other, a suction port (130) provided on the first surface (110), and a blow-out port (132) provided on the second surface (112); and
 a louver (200) that is provided on the upstream side of the suction port (130) and that leads air to the suction port (130) from a direction parallel to the first surface (110), the louver (200) including:
 an annular light emitting unit (320) disposed on
  an inner surface (310) that faces the first surface (110); and
  a surface emitting unit (330) disposed on a back surface that faces opposite to the inner surface (310) and that prevents the air from flowing into the suction port (130) from a direction perpendicular to the first surface (110),
 wherein the annular light emitting unit (320) emits light from the inside of the louver (200) toward an outer circumference, with respect to the entire circumference direction,
 wherein the surface emitting unit (330) emits light in the vertical direction directed opposite to the casing (100), and
 wherein light intensity of the surface emitting unit (330) is greater than light intensity of the annular light emitting unit (320).

Item 2

The built-in ventilation fan (1000) according to Item 1, wherein the annular light emitting unit (320) is disposed on the inside of the outer circumference edge (302) of the louver (200).

Item 3

The built-in ventilation fan (1000) according to Item 1, wherein the annular light emitting unit (320) includes:
 a projection (322) projecting annularly in a direction from the inner surface (310) toward the casing (100); and
 a plurality of light emitting units (324) arranged on an outer circumference wall (328) of the projection (322), and
 wherein the plurality of light emitting units (324) emit light toward the outer circumference.

Item 4

The built-in ventilation fan (1000) according to Item 3, wherein the louver (200) includes a power supply unit (340) disposed on the inside of the annular shape of the projection (322), and
 wherein the power supply unit (340) supplies electricity to at least the annular light emitting unit (320) and controls light emission of the plurality of light emitting units (324).

Item 5

The built-in ventilation fan (1000) according to Item 3, wherein the louver (200) includes a human detection sensor (342) disposed on the inside of the annular shape of the projection (322) and closer to the inner surface (310) than a top edge of the projection (322), and
 wherein the human detection sensor (342) detects the presence of a person on the back surface side.

Item 6

The built-in ventilation fan (1000) according to Item 3, wherein the louver (200) includes:
 a base (300) that includes the annular light emitting unit (320) and the surface emitting unit (330); and
 a connection unit (400) that connects the base (300) and the casing (100),
 wherein the connection unit (400) includes:
 a center opening (420) provided in the center; and
 a lattice portion (422) disposed around the center opening (420),
 wherein the center opening (420) allows the air to pass through, and
 wherein the lattice portion (422) allows the air to pass through and reinforces the connection unit (400).

Item 7

The built-in ventilation fan (1000) according to Item 6, wherein the outer circumference wall (328) of the projection (322) is disposed on the inside of the lattice portion (422).

Item 8

The built-in ventilation fan (1000) according to Item 7, wherein the top edge (326) of the outer circumference wall (328) of the projection (322) has a curved surface shape.

The present disclosure has been described with reference to an embodiment. The embodiment is intended to be illustrative only, and it will be obvious to those skilled in the art that various modifications to a combination of constituting elements or processes in the embodiment could be developed and that such modifications also fall within the scope of the present disclosure.

What is claimed is:

1. A built-in ventilation fan, including:
a casing that includes a first surface and a second surface different from each other, a suction port provided on the first surface, and a blow-out port provided on the second surface; and
a louver that is provided on the upstream side of the suction port and that leads air to the suction port from a direction parallel to the first surface,
the louver including:
an annular light emitting unit disposed on an inner surface that faces the first surface; and
a surface emitting unit disposed on a back surface that faces opposite to the inner surface and that prevents the air from flowing into the suction port from a direction perpendicular to the first surface,
wherein the annular light emitting unit emits light from the inside of the louver toward an outer circumference, with respect to the entire circumference direction,
wherein the surface emitting unit emits light in the vertical direction directed opposite to the casing, and
wherein light intensity of the surface emitting unit is greater than light intensity of the annular light emitting unit.

2. The built-in ventilation fan according to claim 1, wherein the annular light emitting unit is disposed on the inside of the outer circumference edge of the louver.

3. The built-in ventilation fan according to claim 1, wherein the annular light emitting unit includes:
a projection projecting annularly in a direction from the inner surface toward the casing; and
a plurality of light emitting units arranged on an outer circumference wall of the projection, and
wherein the plurality of light emitting units emit light toward the outer circumference.

4. The built-in ventilation fan according to claim 3, wherein the louver includes a power supply unit disposed on the inside of the annular shape of the projection, and
wherein the power supply unit supplies electricity to at least the annular light emitting unit and controls light emission of the plurality of light emitting units.

5. The built-in ventilation fan according to claim 3, wherein the louver includes a human detection sensor disposed on the inside of the annular shape of the projection and closer to the inner surface than a top edge of the projection, and
wherein the human detection sensor detects the presence of a person on the back surface side.

6. The built-in ventilation fan according to claim 3, wherein the louver includes:
a base that includes the annular light emitting unit and the surface emitting unit; and
a connection unit that connects the base and the casing, wherein the connection unit includes:
a center opening provided in the center; and
a lattice portion disposed around the center opening,
wherein the center opening allows the air to pass through, and
wherein the lattice portion allows the air to pass through and reinforces the connection unit.

7. The built-in ventilation fan according to claim 6, wherein the outer circumference wall of the projection is disposed on the inside of the lattice portion.

8. The built-in ventilation fan according to claim 7, wherein the top edge of the outer circumference wall of the projection has a curved surface shape.

* * * * *